I. C. Taylor,
Medical Spoon.
Nº 8,749.   Patented Feb. 17, 1852.

UNITED STATES PATENT OFFICE.

J. C. TAYLOR, OF WEST LIBERTY, OHIO.

SPOON FOR ADMINISTERING MEDICINES.

Specification of Letters Patent No. 8,749, dated February 17, 1852.

*To all whom it may concern:*

Be it known that I, J. C. TAYLOR, of West Liberty, in the county of Logan and State of Ohio, have invented a new and useful Medical Spoon; and I do hereby declare that the following is a full and exact description, reference being had to the accompanying drawings.

Figure 1:
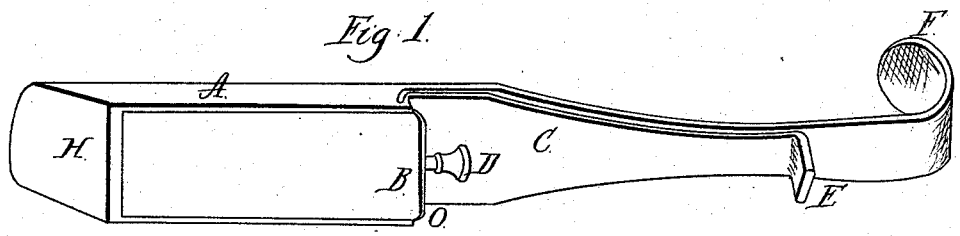

Figure 1, is a perspective view of my spoon, which I will now proceed to describe so that any one skilled in the art, can make, and use my invention. I will first describe its construction; and then, its mode of operation.

A in Fig. 1 shows one of the sides of the spoon and B, the sliding top, which slides into beveled grooves made along the upper and inner edges of the sides. One end of this lid or slide is turned up, so as to facilitate its removal and replacement. C, represents the sliding bottom or tongue, with its outer end turned up at E, to serve as a handle. This slide passes freely into a slit in the bottom of the spoon near O, O, and makes a second bottom to the spoon. D is a knob connected with a wire, which will be hereafter described. F shows the way in which the handle is formed, or it may be formed into a loop. H shows the beveled end of the spoon, and the rounded point, so that there shall be no sharp edges or angles near the point. This spoon I make about seven inches long, one inch wide, and half an inch deep.

Figure 2:
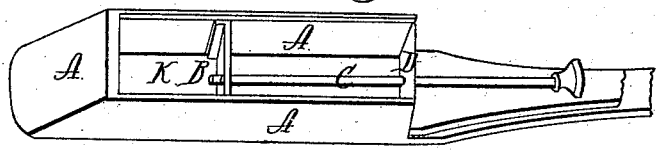

Fig. 2, is a representation of the bowl or body of this spoon with the top removed so as to show the inside. A, A, A, is the body of the spoon. B is a slide, closely fitting the cavity of the spoon into which a rod C is screwed, which rod passing through the end D, is used for moving the slide B along the body of the spoon.

Figure 4:
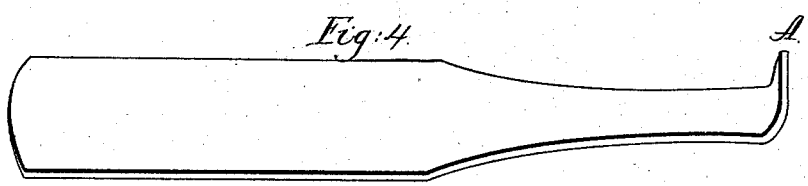
Figure 3:
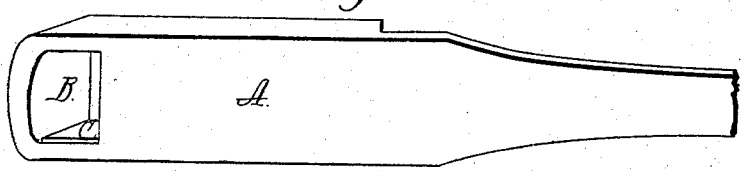

Fig. 3, is a view of the bottom of the spoon. A shows the bottom and B an opening near the end of A. This opening is covered over by the slide or tongue (Fig. 4,) which passing along the inside of the bottom when shoved in, closes the opening (B, Fig. 3,) and when it is withdrawn a little, it leaves the aperture open.

Figure 5:
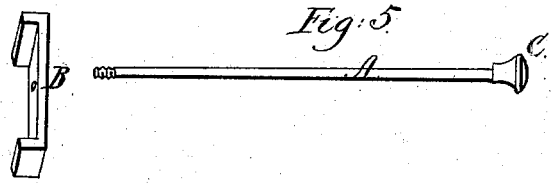

Fig. 5, is a view of the scraper or slide (marked B in Fig. 2,) showing the manner in which it may be separated and put together in the body of the spoon. A, is a rod one end of which, screws into the slide B by means of the thumb-screw or knob C. This spoon is so arranged that when the top is slid out the cavity K, Fig. 2, is left open, and may be filled with a medical tincture or drug; when the lid may be replaced. The spoon is placed in the mouth of the patient;—the slide or tongue G Fig. 1 is drawn out, and the knob or thumb-screw D of Fig. 1 is at the same time pushed in, thereby pushing the scraper (B, Fig. 2,) along the cavity of the spoon which acting as a piston, forces the contents of the spoon into the throat. The handle E, and the knob D, of Fig. 1, are so arranged that the slide C may be drawn out, and thereby open the orifice (B, Fig. 3,) and simultaneously the knob D, may be pushed in and thereby empty the contents of the spoon.

What I claim, as my invention, and desire to secure by Letters-Patent is:—

1. The particular construction of my spoon with a sliding bottom, and a piston slide exactly fitting the cavity of the spoon, and the sliding rod so arranged that it may be slid in at the same moment that the slide tongue or bottom is drawn out, thereby quickly emptying the spoon of its contents. I do not claim that my spoon should be a graduating or measuring spoon but merely for administering medicines already graduated by the physician.

2. I claim also that my spoon will secure from its arrangement, the advantage of preserving the teeth, and administering all the medicines graduated by the physician. A difficulty often experienced in treating children.

J. C. TAYLOR.

Witnesses:
L. F. WARD,
JAMES McDONALD.